US012030213B2

(12) United States Patent
Albano

(10) Patent No.: US 12,030,213 B2
(45) Date of Patent: Jul. 9, 2024

(54) FORM FRAME FOR CONCRETE FOOTING HAVING MEANS TO PREVENT MOVEMENT BETWEEN FORMS AND POSITIONING OF REINFORCEMENT MEMBERS

(71) Applicant: Rocchino Albano, East Rochester, NY (US)

(72) Inventor: Rocchino Albano, East Rochester, NY (US)

( * ) Notice: Subject to any disclaimer, the term of this patent is extended or adjusted under 35 U.S.C. 154(b) by 0 days.

(21) Appl. No.: 16/819,139

(22) Filed: Mar. 15, 2020

(65) Prior Publication Data

US 2020/0391408 A1 Dec. 17, 2020

Related U.S. Application Data

(60) Provisional application No. 62/859,873, filed on Jun. 11, 2019.

(51) Int. Cl.
*B28B 23/00* (2006.01)
*B28B 7/00* (2006.01)

(52) U.S. Cl.
CPC .......... *B28B 23/005* (2013.01); *B28B 7/0014* (2013.01)

(58) Field of Classification Search
CPC ..... B28B 23/005; B28B 7/0014; E04G 21/12; E04G 17/001; E04G 21/185; E04G 13/00; E04C 5/12
USPC .......................... 51/781.5, 781.3, 764, 742.1
See application file for complete search history.

(56) References Cited

U.S. PATENT DOCUMENTS

| | | | | | |
|---|---|---|---|---|---|
| 5,156,753 | A * | 10/1992 | Speidel | B28B 7/02 | 249/159 |
| 7,828,263 | B2 * | 11/2010 | Bennett | E04G 13/00 | 249/219.1 |
| 2003/0029130 | A1 * | 2/2003 | Humphrey | E04G 17/12 | 52/742.1 |
| 2016/0222684 | A1 * | 8/2016 | Titcomb | E04G 21/1833 | |

* cited by examiner

*Primary Examiner* — S. Behrooz Ghorishi
(74) *Attorney, Agent, or Firm* — Andrew Morabito

(57) ABSTRACT

A concrete structure forming device, comprising: a frame assembly, comprising; a cross member having a first end and a second end, wherein the cross member at least one first connector positioned on a top side of the cross member, a first receiver connected to the first end of the cross member, wherein the first receiver is designed to receive a form, and a second receiver connected to the second end of the cross member, wherein the second receiver is designed to receive a form and is substantially parallel with the first bracket; and a hook, comprising; a handle, wherein the handle has a second connector designed to connect with the first connector of the cross member, and a hook extending from the handle in a predetermined direction relative to the handle, wherein the hook is designed to receive a reinforcement member.

8 Claims, 4 Drawing Sheets

FORM FRAME FOR CONCRETE FOOTING HAVING MEANS TO PREVENT MOVEMENT BETWEEN FORMS AND POSITIONING OF REINFORCEMENT MEMBERS

BACKGROUND OF THE INVENTION

The present invention relates to masonry, and more particularly to a form for laying rebar in concrete and maintaining the position of the forms.

The present invention relates to the masonry field, especially to the art of laying up forms in which concrete footings are poured. Forms for concrete footings are set up with an inner and outer wall and are usually made of dimensional lumber or heavy plywood panels or may even be manufactured aluminum panels. The inner and outer walls confine the liquid concrete and give it its final shape and dimension. Depending on the type of structure being set on these footings, the inner and outer walls may be spaced apart 12 inches, 16 inches, 24 inches or wider. Problems occur when the concrete confined between the inner and outer walls exerts a force on the forms pushing them apart until they collapse under the force resulting in what's known as a blowout. Blowouts not only cause loss of money to the contractor due to the loss of the concrete that escapes the forms, but much labor is needed to clean up the blowout and to reset the forms.

Another problem that is encountered when pouring the footings is that the top edges of the forms sometimes tend to curve inward toward each other due to the forces pushing outwardly at the bottom edges of the forms. This can result in an upper surface of the footing being too narrow to pass inspection. If this happens, the entire footing must be redone to get the proper width to meet local building codes.

Efforts have been made to correct these undesirable situations. A typical approach is to nail wooden spacers across the top of wooden forms, and to drive support stakes alongside the forms and to nail the forms to the stakes. While this approach can be effective in some circumstances, the wooden spacers are generally not reusable, are not adjustable, and do not have the strength required for large forms with a large width. Driving stakes into the ground is labor intensive and can result in injuries due to missing the stakes with the sledgehammer and striking one's hands. Further, wooden spacers and supporting stakes cannot be used on aluminum forms at all. Another approach is to use metal clips that clip between the upper edges of the inner and outer form walls. Again, these clips do not have the necessary strength for large forms, and they are not adjustable.

SUMMARY

Accordingly, it is an objective of the present invention is a concrete structure forming device, comprising: a first member comprising, a cross member having a first end and a second end, wherein a set of protrusions extend distal to the first end and the second end, wherein the protrusions are positioned a predetermined distance from one another, and a first set of mounting points are positioned at predetermined locations between the first end and the second end, and a second member comprising, a grip with a hook extending from the grip and a second mounting point positioned on a surface of the grip, wherein the first set of mounting points interacts with the second mounting point.

In a second embodiment, the present invention is a concrete structure forming device, comprising: a form; and a frame assembly, comprising; a first member comprising, a cross member having a first end and a second end, wherein a channel sized to receive a form extends from the first end and the second end, and a first set of mounting points are positioned at predetermined locations between the first end and the second end, a second member comprising, a grip with a hook extending from the grip, wherein the hook is sized to receive a reinforcement member and a second mounting point positioned on a surface of the grip, and wherein the first set of mounting points connect with the second mounting point to secure the grip in a set location.

In a third embodiment, the present invention is a concrete structure forming device, comprising: a frame assembly, comprising; a cross member having a first end and a second end, wherein the cross member at least one first connector positioned on a top side of the cross member, a first receiver connected to the first end of the cross member, wherein the first receiver is designed to receive a form, and a second receiver connected to the second end of the cross member, wherein the second receiver is designed to receive a form and is substantially parallel with the first bracket; and a hook, comprising; a handle, wherein the handle has a second connector designed to connect with the first connector of the cross member, and a hook extending from the handle in a predetermined direction relative to the handle, wherein the hook is designed to receive a reinforcement member.

DETAILED DESCRIPTION OF THE INVENTION

Figure 1:
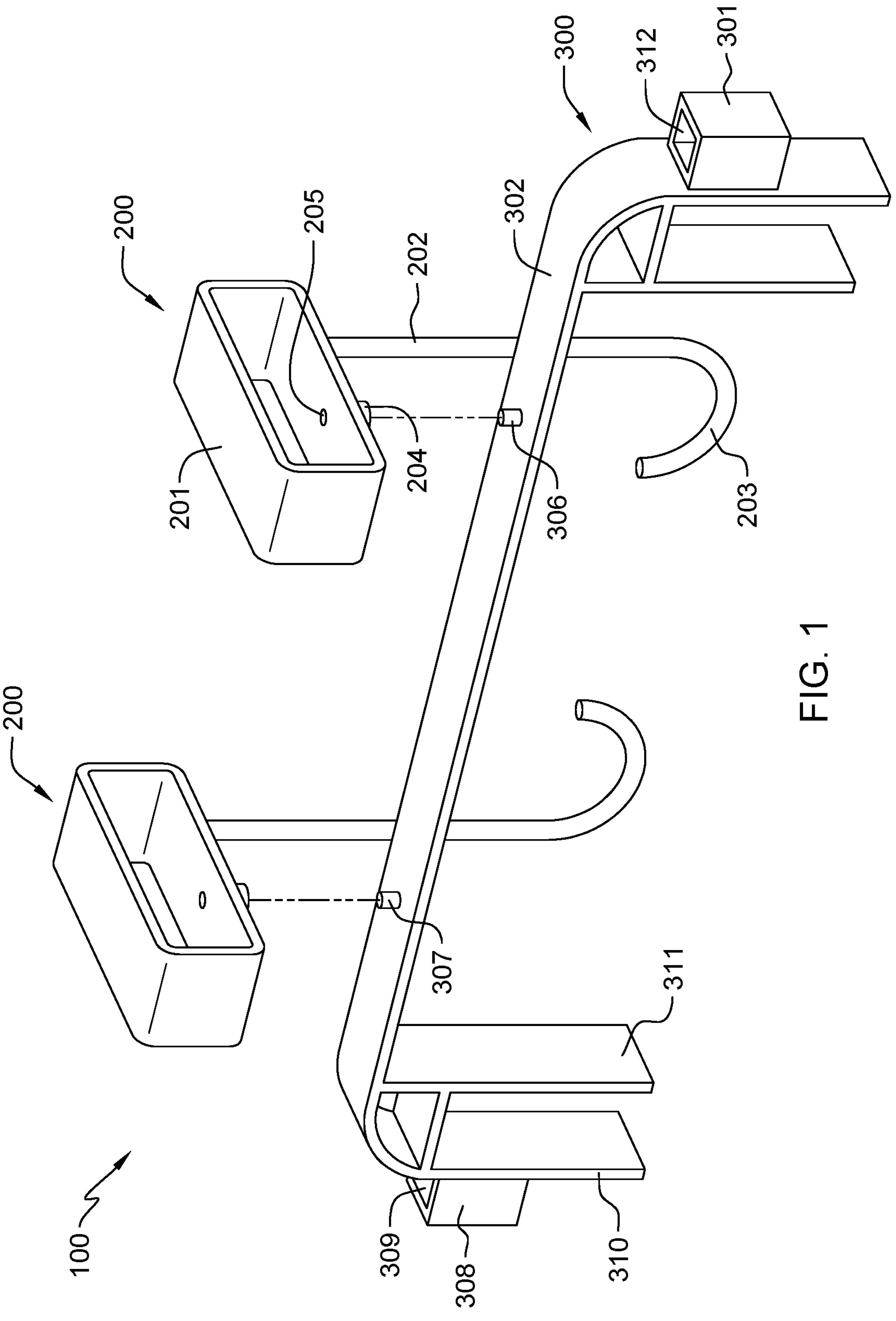
FIG. 1 depicts an isometric view of a frame disassembled, in accordance with one embodiment of the present invention.

The present invention provides for a device to assist in the framing and positioning of reinforcement members when working in the masonry field. Due to the disadvantages and drawbacks of the current devices, the present invention provides for a simple, efficient, and effect device to lock the framing members for the concrete (or other masonry materials), and provide a simple and secure way to position any reinforcement members within the concrete so that the reinforcement members are positioned correctly and steadily.

The present invention overcomes the drawbacks of these prior attempts to constrain the forms to the desired width. The present invention provides a steel frame of high strength that extends between the inner and outer form walls and prevents the form walls from bowing inwardly and narrowing the footing and prevents the forms from blowing out. The steel frame is adjustable to accommodate form widths from 16 inches or less to 24 inches or more. The steel frame is reusable, easy to put into place on the forms, and simple to take down and make ready for the next job. The use of the frame of the present invention can result in a savings in labor costs to the contractor, not only in setting up forms for a concrete pour and taking down forms, but in saved labor due to not having to redo footings or cleaning up from blowouts.

The use of the frames of the present invention is also safer, as no hammering of nails or stakes is necessary.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

Figure 2:
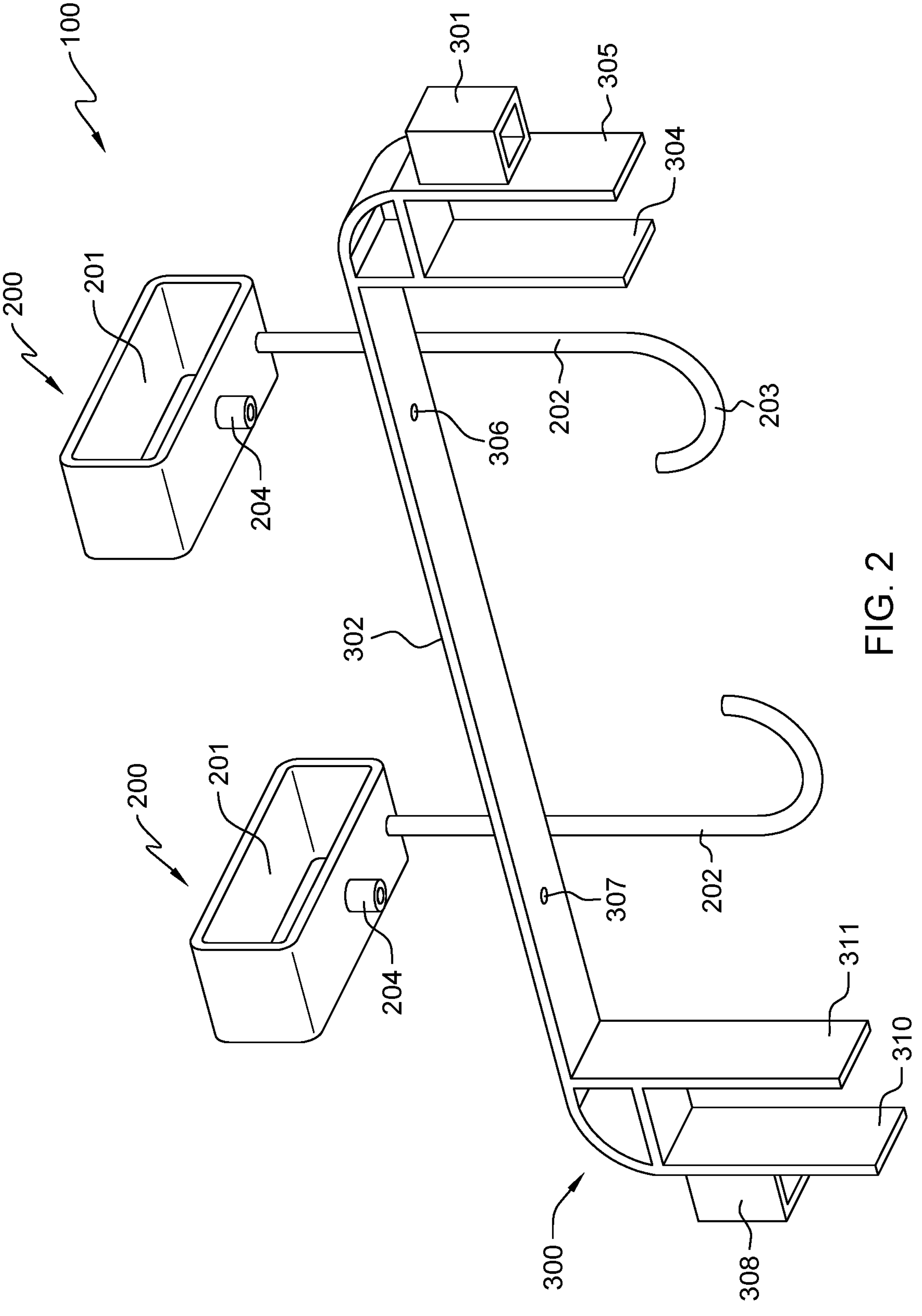
FIG. 2 depicts an isometric view of the frame disassembled, in accordance with one embodiment of the present invention.

FIGS. 1 and 2 depict illustrations of the frame assembly 100, in accordance with an embodiment of the present invention. In the depicted embodiment, the frame assembly 100 is comprised of a handle 200 and a frame support 300.

The handle 200 is designed to provide an easily graspable component to secure to the frame support 300 when positioning reinforcement members within the masonry material. The reinforcement members, maybe, but not limited to, rebar and the masonry material may be, but is not limited to concrete. The handle 200 is comprised of a grip 201, an extension 202 and a socket 204. The extension 202 as depicted has a curved end 203 to receive and support the reinforcement member. The length of the extension 202 and the curvature 203 are based on the application and the project. In the depicted embodiment the handles 200 have mirrored extensions and curvatures. In some embodiments, the extension is removable and replaceable from the grip 201. The grip 201 is designed to be able to be held by a person and provide the structure to support the extension 202 and the socket 204. The socket 204 is designed to be received by or receive an element of the frame support 200 to secure the handle 200 in place. In some embodiments, the socket 204 is an aperture 205 in the grip 201 which the frame support element secures into.

The frame support 300 is used to secure the form members, the securement members, and provide the positioning for the handles 200. The frame support 300 is comprised of a long crossbar 302 of a predetermined length. At each end of the frame support 300 are extensions 304, 305, 310, 311 which are of a predetermined length, thickness, and distance apartment to accommodate the framing member. The orientation of the extensions 304, 305, 310, 311 is substantially parallel, but may be in varying orientations based on the type of form member used. Attached to the external extensions (310 and 305) is a receptacle 301 and 308 which is designed to receipt the support member through an aperture 312 and 309 respectively. The receptacles are positioned on the outside of the extensions so that the support member can be secured into the ground outside of the form member. The length, height, and size of the aperture are based on the application of the frame support and the project requirements. In the depicted embodiment, the corners of the crossbar 302 have apertures, but are not necessary or required. At predetermined positions across the top of the crossbar 302 are mounting points 307 and 306. These mounting points 307 and 306 are positioned based on the intended position of the reinforcement based on the handle 200 design. The mounting points 307 and 306 are sized to fit within the socket 204 of the handles 200. In some embodiments, the mounting points 307 and 306 are apertures and the socket 204 is designed to fit within the mounting points. The extensions 304, 305, 310, and 312 preventing bowing of the form members 500 either inwardly or outwardly due to the constraining action of the extensions, and blowouts of the forms are prevented due to the outwardly constraining action of the extensions.

Figure 3:
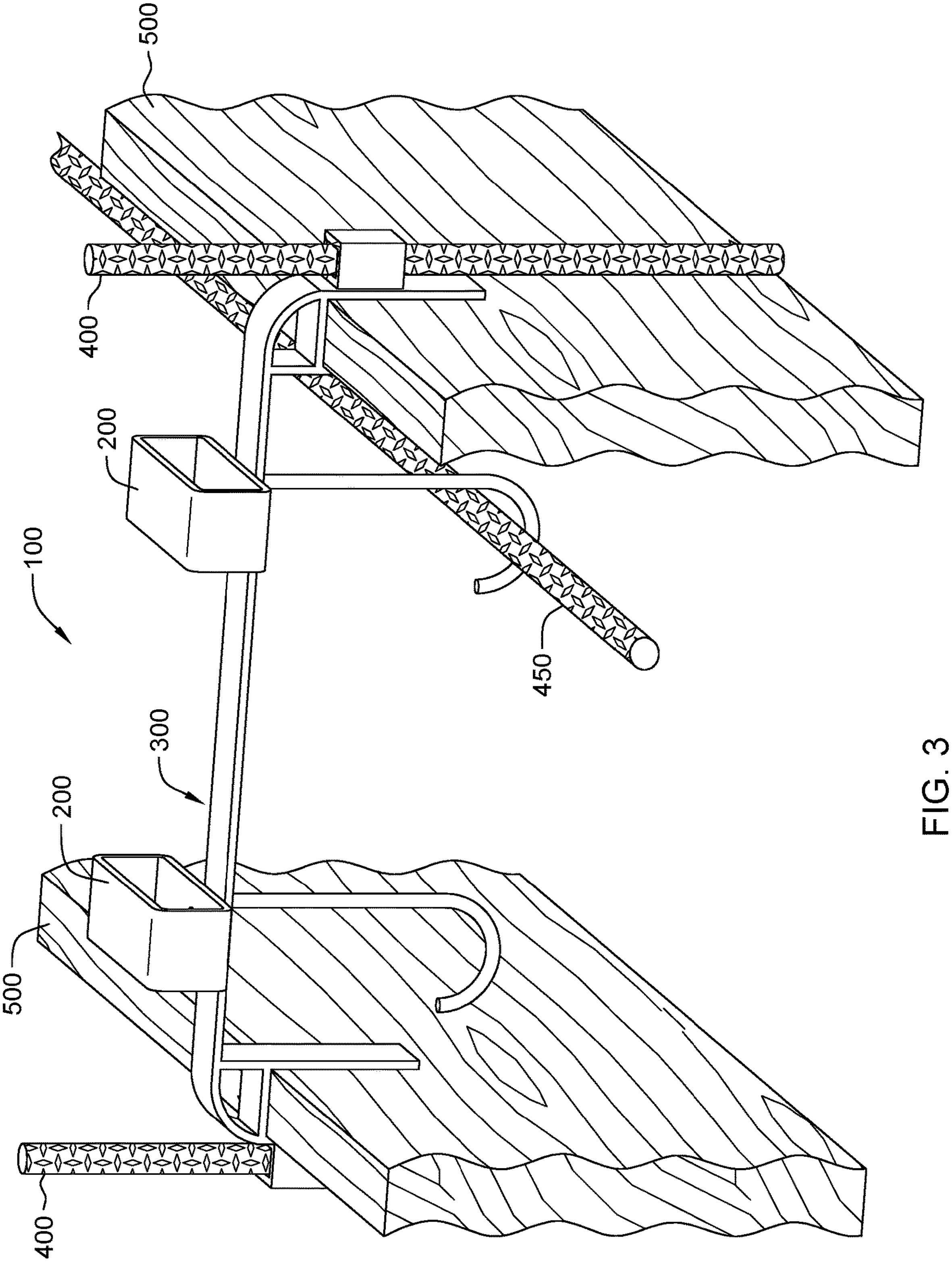
FIG. 3 depicts an isometric view of the frame in use, in accordance with one embodiment of the present invention.

FIG. 3 depicts an illustration of the frame assembly 100 in use, in accordance with an embodiment of the present invention. In the depicted embodiment, the frame assembly 100 is comprised of a handle 200 and a frame support 300 and is shown with the form members 500, the support members 400, and the rebar 450. The handles 200 are secure to the frame 300 and assist with positioning the rebar 450 at the proper height, position, and angle. So that when the concrete is poured, the rebar 450 is positioned correctly throughout the space between the form members. This provides a tremendous advantage of allowing the construction site to be prepared completely before the concrete is poured quickly and exactly as intended without the opportunity for error. The handles 200 are designed to easily connect to the crossbar 302. The placement of the handles 200 is correct based on the mounting points.

In the depicted embodiment, the handle 200 and the crossbar 302 are perpendicular. In some embodiments the handle 200 and the crossbar 302 may be parallel. Additionally, the position of the curved end of the extension 202 may be at various positions relative to the handle 200. In the depicted embodiment, the rebar 450 is designed to substantially parallel to one another and the forms 2500 create a substantially straight concrete structure.

Vertical supports 400 are shown passing through the receptacles of the frame support 300. The vertical supports 400 are secured into the ground to provide additional support for the frame supports 300 and the form members 500. In some embodiments, the receptacles are not necessarily due to the length of the extensions 304, 305, 310, 311. In the depicted embodiment the hook end of the handle 200 extends below the ends of the extensions 304, 305, 310, 311 so that when the concrete is poured the extensions 304, 305, 310, 311 do not leave markings in the concrete, but the rebar 450 will be submerged in the concrete.

Figure 4:
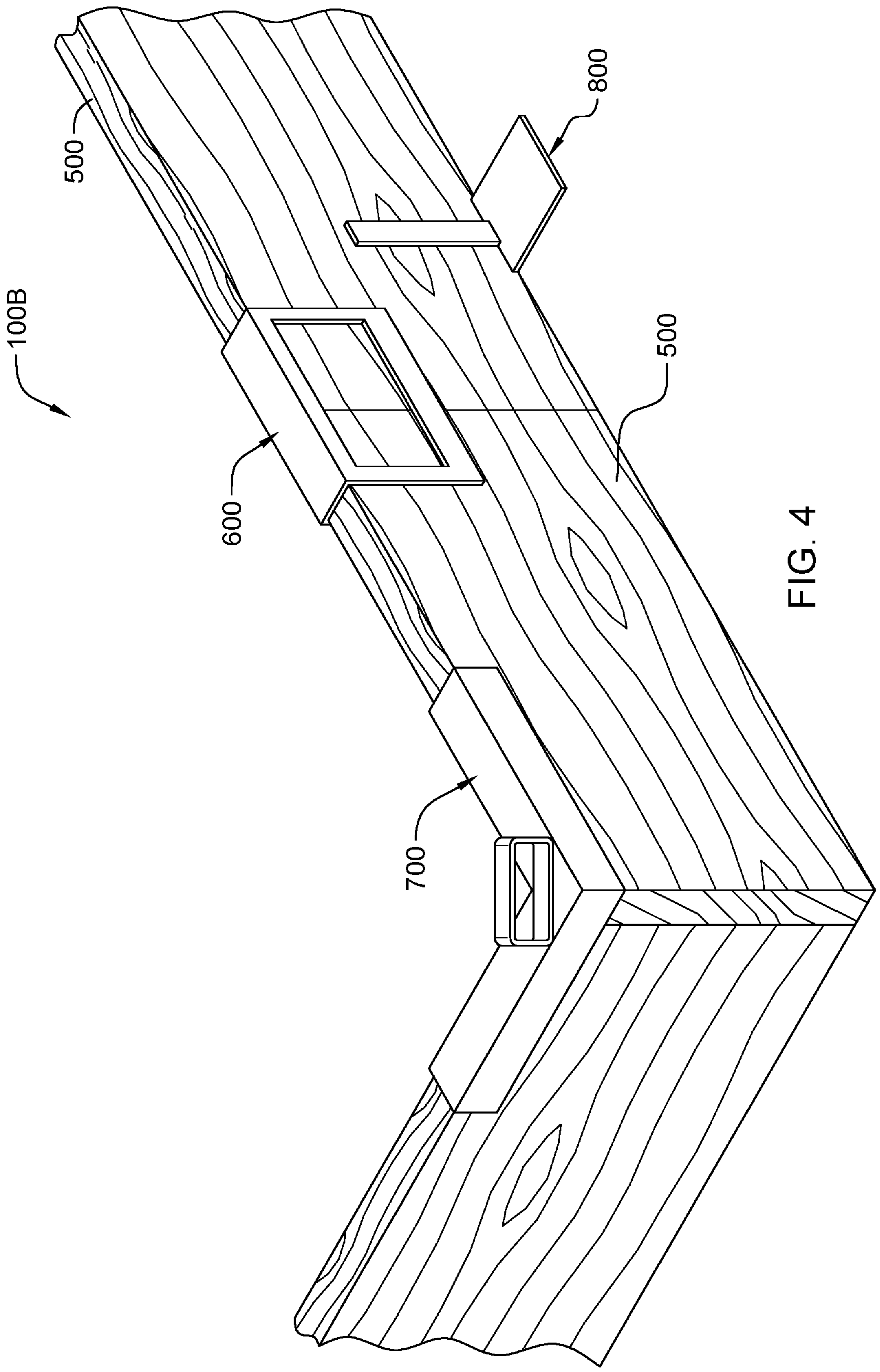
FIG. 4 depicts a view of additional form members in use, in accordance with one embodiment of the present invention.

Shown in FIG. 4 are additional components of an assembly, in accordance with one embodiment of the present invention. In the depicted embodiment, form members 500 are secured in place due to a corner model 700, an overlap fixture 600, and a footer 800 is shown. Based on the placement of the frame assembly 100, additional components may be needed to secure the form members 500. If the support member 300 does not have the receptacles, the footers 800 may be needed to provide additional support for the form members 500. The footers 800 may be secured to the form member through the use of fasteners or may be secured into the ground with spikes or the like. The overlap fixture 600 may be needed where two form members 500 connect if a frame assembly 100 is not placed close to the overlap. The overlap fixture 600 slides over top of the form members 500 and firmly secures them in place. By having a width that is greater than the contact of the boards, the overlap fixture 600 keeps the two form members 500 in place. The corner model 700 provides support for a corner where two form members 500 meet. The corner model 700 in the depicted embodiment, provides for two portions that are set at a 90-degree angle and are placed over the top of the form members 500. In the depicted embodiment, the corner model 700 has a handle. In various embodiments, the corner model 700, the overlap fixture 600, and the footer 800 may have various apertures to allow fasteners to be secured through the elements and into the form members 500.

Form members 500 are typically made of dimensional lumber but may be made of heavy weight plywood or even of lightweight metal such as aluminum.

In some embodiments the crossbar 302 is telescopic, allowing for adjustment of the width of the frame assembly 100. Crossbar 302 may have a locking mechanism to secure the crossbar 302 at a set length. Crossbar 302 may have holes or indents at fixed positions along its length to allow for specific adjustments, such as widths of 16 inches, 18 inches, 24 inches, etc.

In some embodiments the width between the legs of the brackets 102 and 104. In some situations, the forms are overlapped to prevent leaking of concrete at the joint and to give strength to the joint in the forms. The thickness of the form at this point is twice that of the form where they are not overlapped. The brackets are sized for this thickness of the two (or more) forms. In some embodiments, the frame 100 is placed between joints of the forms and the bracket width is that of only one form.

In some embodiments, various types of male and female connection mechanisms can be used to replace the mounting points and the sockets. Through various locking mechanisms and contraptions, which are known to one skilled in the art. The mounting point and the sockets are used to provide for specific placement of the handles 200 relative to the form members 500.

When in use multiple frame assemblies 100 may be used at set distances to provide the structural support for the form members 500 and also be placed relative to the length and requirements of the rebar.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A concrete structure forming device, comprising:

a first member comprising, a cross member having a first end and a second end, wherein a set of protrusions extend distal each to the first end and the second end, wherein the protrusions are positioned at a predetermined distance from one another, and a first set of mounting points are positioned at predetermined locations between the first end and the second end on an upper surface of the cross member, and wherein an outer protrusions of the set of protrusions have receptacles integrated into the outer protrusion, and a set of removable and rotatable hangers comprising, a handle with a hook extending from the handle and a second mounting point integrated into the handle, wherein the first set of mounting points interacts with the second mounting point of each handle, and the set of removable and rotatable hangers are removable from the first member without the first member being disturbed.

2. The concrete structure forming device of claim 1, wherein the protrusions are substantially perpendicular and in substantially the same orientation relative to the cross member.

3. The concrete structure forming device of claim 1, wherein the cross member is telescopic.

4. The concrete structure forming device of claim 1, wherein a low point of each hook of the hanger is positioned at a predetermined distance below a bottom edge of the set of protrusions.

5. A concrete structure forming device, comprising:

a first member comprising, a cross member having a first end and a second end, and a set of protrusions extending from the first end and the second end each, and a first set of mounting points are positioned at predetermined locations between the first end and the second end along a top surface of the cross member, and a receptable integrated into an outside surface of an outer protrusion of each set of protrusions;

a set of removable and rotatable handles comprising, a grip with a hook extending from the grip, wherein the hook is sized to receive a reinforcement member and a second mounting point positioned on a lower surface of the grip, and wherein the first set of mounting points connects with the second mounting point of each grip to secure the handles in a set location, and wherein the hook has a curved end, wherein when the set of removable and rotatable handles are attached to the first member more than one reinforcement member is suspended from the hooks and when the set of removable and rotatable handles are removed from the first member, the first member is unaffected.

6. The concrete structure forming device of claim 5, wherein when the set of removable and rotatable handles is connected to the first member, the hook is orientated in a set orientation.

7. The concrete structure forming device of claim 5, wherein when the direction of the grip is perpendicular to the direction of the hook.

8. A concrete structure forming device, comprising:

a unitary frame assembly, comprising;

a cross member having a first end and a second end, wherein the cross member has at least one first connector positioned on a top side of the cross member, a first receiver connected to the first end of the cross member, wherein the first receiver is designed to receive a form, and a second receiver connected to the second end of the cross member, wherein the second receiver is designed to receive another form and is substantially parallel with the first receiver; and a set of hooks, comprising;

a handle, wherein the handle has a second connector designed to connect with the at least one first connector of the cross member, and a curved hook extending from the handle in a predetermined direction relative to the handle, wherein the set of hooks are designed to receive a reinforcement member; and receptacles integrated into the first receiver and the second receiver and are designed to receive a support for the forms;

wherein the set of hooks are removable from the unitary first member without having to move the unitary first member from its installed position.

* * * * *